April 3, 1962 A. V. PADGETT 3,027,930
APPARATUS FOR STRAIGHTENING VEHICLE FRAMES
Filed Oct. 23, 1958 2 Sheets-Sheet 1
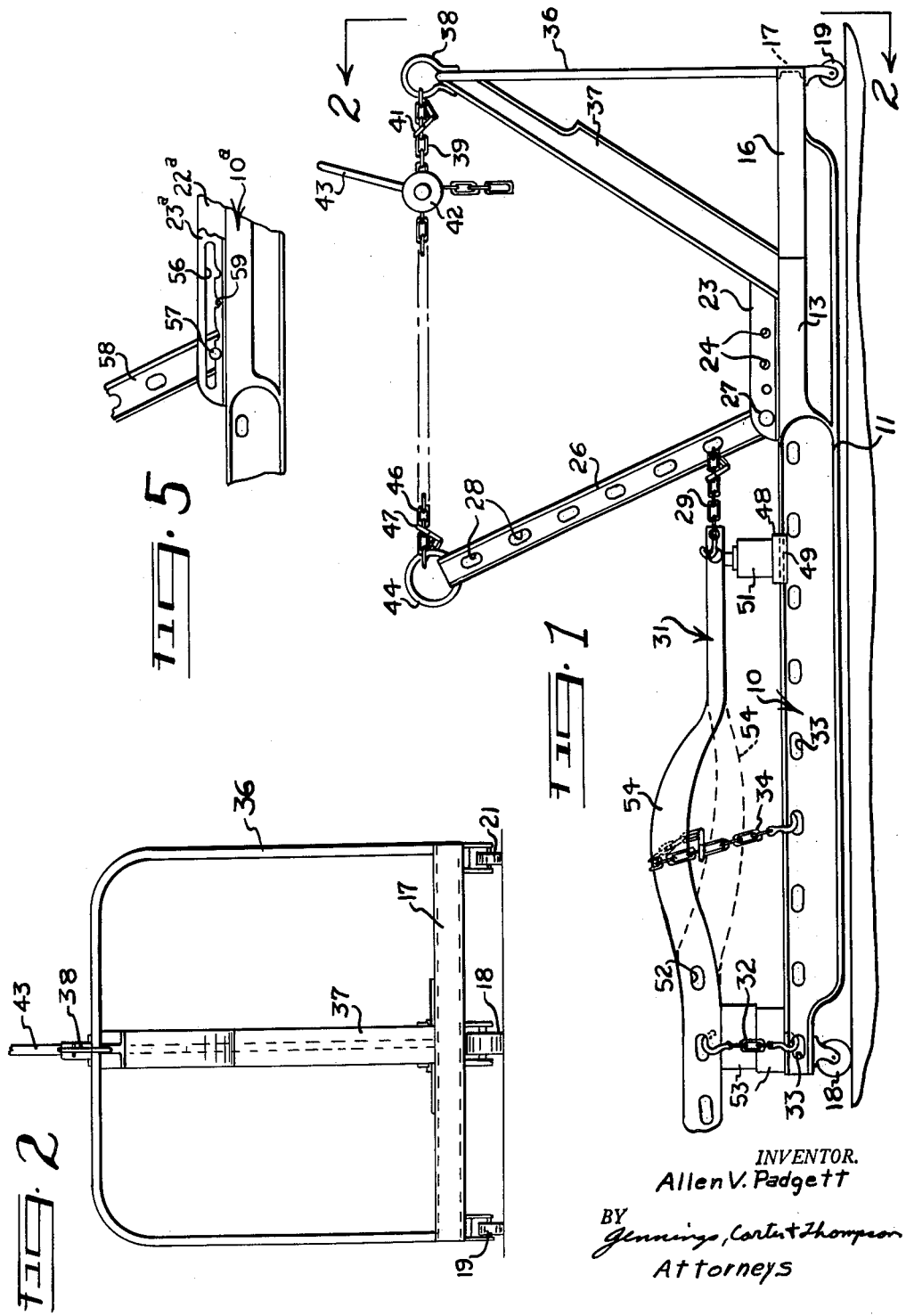
INVENTOR.
Allen V. Padgett
BY
Jennings, Carter + Thompson
Attorneys

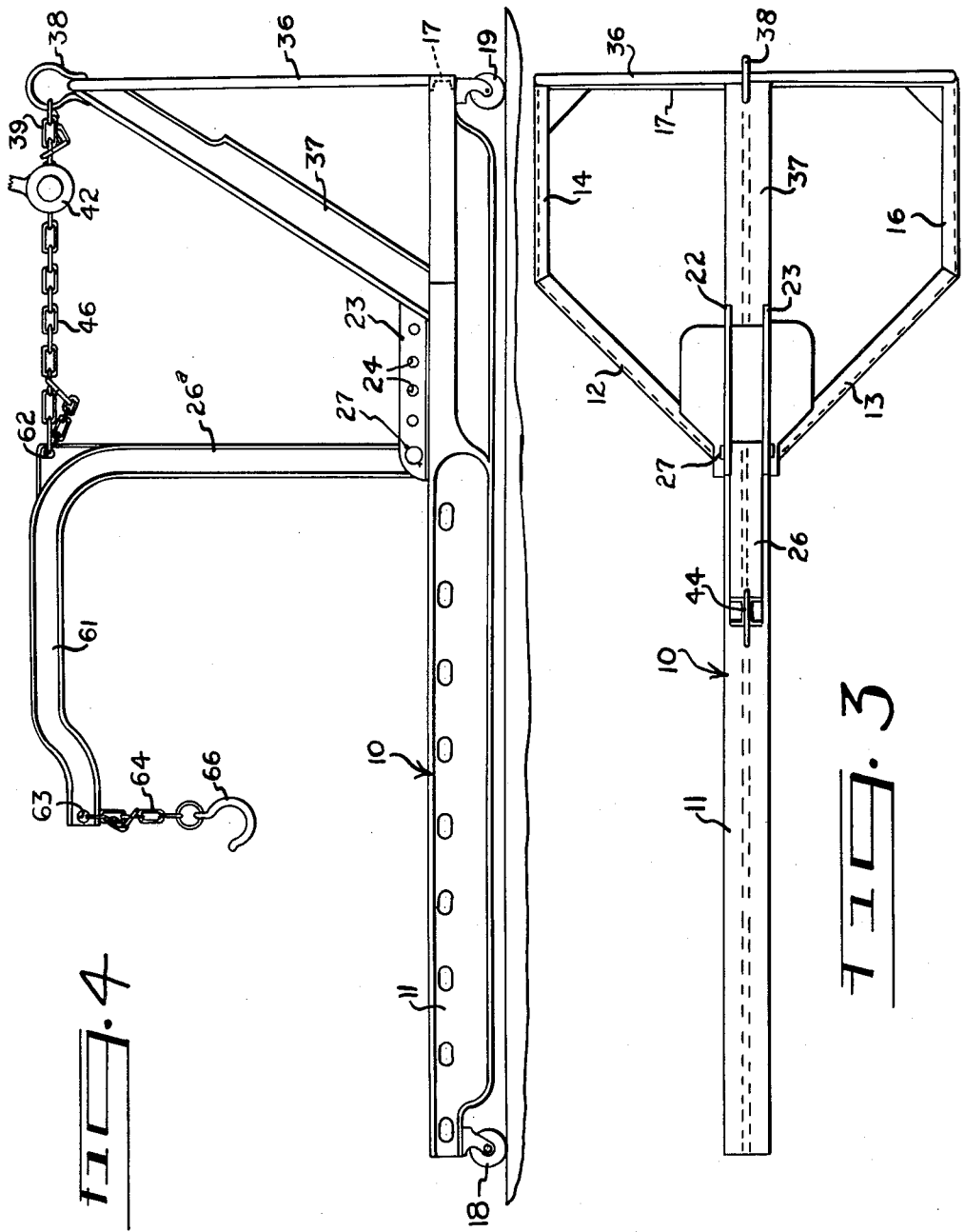

3,027,930
APPARATUS FOR STRAIGHTENING
VEHICLE FRAMES
Allen V. Padgett, Rte. 16, Box 960, Birmingham, Ala.
Filed Oct. 23, 1958, Ser. No. 769,260
7 Claims. (Cl. 153—32)

This invention relates to apparatus for straightening vehicle frames and has for an object the provision of versatile apparatus which shall be adapted for straightening various portions of a vehicle regardless of the particular position of the bent portion thereof.

Another object of my invention is to provide apparatus for straightening vehicle frames of the character designated which shall be adapted for insertion beneath a vehicle having a relatively low chassis.

Another object of my invention is to provide apparatus for straightening vehicle frames in which a maximum amount of pull can be applied at each end of the portion of the vehicle frame to be straightened by merely employing a hand-operated power puller in association with my improved apparatus.

A further object of my invention is to provide apparatus for straightening vehicle frames of the character designated which shall be adapted for applying pull to opposite ends of the portion of the vehicle frame to be straightened in any desired direction and in which means is provided for moving the intermediate portion of the vehicle frame in the desired direction as the frame is straightened.

A still further object of my invention is to provide apparatus for straightening vehicle frames of the character designated which shall be simple of construction, economical of manufacture and one which may be operated by unskilled labor as well as skilled labor to straighten a vehicle frame in a minimum of time.

Heretofore in the art to which my invention relates, various devices have been proposed for straightening vehicle frames and the like. However, such apparatus requires highly skilled personnel to operate the same and the apparatus is not adapted for straightening portions of the vehicle frame which are located at inaccessible positions. Also, with such apparatus, the bent portion of the vehicle frame cannot be pulled in the proper direction at all times to assure proper straightening of the frame. Furthermore, with such apparatus, there is no control over the intermediate section of the portion being straightened, to assure that the straightened portion assumes the proper contour.

To overcome the above and other difficulties, I provide an elongated, translatable frame which is adapted for insertion beneath a vehicle. An upstanding bracket is pivotally mounted at its lower end to the intermediate portion of the elongated frame and means is provided for connecting the upstanding bracket intermediate its ends to one end of the portion of the vehicle frame to be straightened. The other end of the portion to be straightened is operatively connected to one end of the elongated frame. A prime mover is operatively interposed between the other end of the elongated frame and the upper portion of the upstanding member whereby upon actuation of the prime mover, the upstanding member moves about its pivot point to straighten the frame. To control the intermediate contour of the section of the frame being straightened, I provide means between the elongated frame and the portion of the vehicle frame being straightened whereby the proper overall contour is obtained as the ends of the portion to be straightened are moved outwardly away from each other.

Apparatus embodying features of my invention is illustrated in the accompanying drawings, forming a part of this application, in which:

FIG. 1 is a side elevational view showing my improved apparatus connected to a portion of a vehicle frame;

FIG. 2 is an end elevational view, partly broken away, taken generally along the line 2—2 of FIG. 1;

FIG. 3 is a plan view of the apparatus shown in FIG. 1; the prime mover, flexible connecting members and the portion of the vehicle frame being omitted for the sake of clarity;

FIG. 4 is a side elevational view, partly broken away, showing a modified form of my invention; and FIG. 5 is a fragmental side elevational view showing a modified form of connection between the upstanding bracket and the elongated frame.

Referring now to the drawings for a better understanding of my invention, I show an elongated frame 10 which may be in the form of an I-beam 11 which extends the entire length of the apparatus. Secured to opposite sides of the I-beam 11 are outwardly and rearwardly extending channel members 12 and 13 which are connected to rearwardly extending channel members 14 and 16, respectively. Connecting the rear ends of the channel members 14 and 16 is a transverse rear channel member 17.

The forward end of the elongated frame 10 is supported by a caster roller 18 and the rear end of the elongated frame is supported by caster rollers 19 and 21 which are mounted adjacent the ends of the transverse rear channel 17, as clearly shown in FIG. 2. As shown in FIG. 1, the bottom of the I-beam 11, which forms the bottom of the elongated frame 10, is slightly above the bottom of the caster rollers 18, 19 and 21 whereby the elongated frame is supported as near the floor or other supporting surface as possible, thus permitting the apparatus to be inserted beneath relatively low vehicle frames and the like.

Mounted on the I-beam 11 intermediate the ends thereof is a pair of laterally spaced, longitudinally extending vertical members 22 and 23 having a plurality of longitudinally spaced openings 24 therein, as shown in FIG. 1. Positioned between the vertical members 22 and 23 is the lower end of an upstanding bracket 26. The lower end of the bracket 26 is provided with a suitable opening therethrough for receiving a pivot pin 27 which passes through selected ones of the openings 24 whereby the lower end of the upstanding bracket 26 is pivotally supported at selected longitudinal positions relative to the elongated frame 10.

The upstanding bracket 26 is provided with a plurality of longitudinally spaced openings 28 therein for receiving one end of a suitable flexible member, such as a chain 29 having hooks at opposite ends thereof, whereby the portion of the upstanding bracket 26 intermediate the ends thereof may be connected to a portion of a vehicle frame to be straightened, indicated generally at 31. The other end of the portion of the vehicle frame to be straightened is connected to the forward end of the elongated frame 10 by means of a flexible member 32. Suitable hooks are provided at opposite ends of the flexible member 32 and one hook passes through an opening 33 provided in the I-beam 11. Preferably, a plurality of longitudinally spaced openings 33 is provided in the I-beam 11 whereby the frame to be straightened may be connected at selected longitudinal positions by a flexible member 34 to the elongated frame 10, thus assuring that the superjacent portion of the frame being straightened does not move outwardly of the elongated frame 10.

Mounted adjacent the rear end of the elongated frame 10 is an inverted U-shaped frame 36. A suitable brace 37 connects the upper portion of the U-shaped frame 36 to the I-beam 11, whereby a strong rigid structure is provided.

Mounted adjacent the upper end of the U-shaped frame 36 is a loop or ring member 38 for receiving a flexible member 39, such as a chain. Preferably, a hook 41 is provided adjacent one end of the chain 39 whereby upon inserting the chain 39 through the loop 38, the hook engages the chain, thus connecting the chain 39 to the loop 38. The other end of the chain 39 is connected to a prime mover 42, which may be in the form of a suitable power puller having an operating handle 43. Mounted adjacent the upper end of the upstanding bracket 26 is a loop member 44 for receiving a flexible member 46, such as a chain. A hook 47 is provided adjacent one end of the chain 46 for attaching the chain to the loop 44, as shown in FIG. 1. The other end of the chain 46 is connected to the power puller 42 in the usual manner, whereby upon actuation of the operating handle 43, the chain 46 can be lengthened or extended, as desired.

Mounted for sliding movement along the upper flanges of the I-beam 11 is a bracket 48 having inturned flanges 49 which engage the under surface of the upper flanges of the I-beam 11. Mounted on the bracket 48 is a jack 51 which is adapted to engage the under surface of the portion of the frame being straightened, as shown in FIG. 1, whereby the superjacent portion of the frame being straightened can be forced upwardly by the jack, if desired.

From the foregoing description, the operation of my improved apparatus shown in FIGS. 1–4 will be readily understood. The forward end of the elongated frame 10 is inserted beneath the vehicle frame, indicated generally at 31. The forward end of the frame 10 is then connected to one end of the portion 31 to be straightened by inserting the flexible member 32 through an opening 33 and through a suitable opening 52 provided in the member 31 to be straightened. Also, the flexible member 32 may be secured to the vehicle frame by passing the flexible member around the portion 31 to be straightened. The other end of the portion 31 to be straightened is connected to one end of the flexible member 29 and the other end of the flexible member 29 is secured to a selected one of the openings 28 in the upstanding bracket 26, as shown in FIG. 1. If it is desired to hold both ends of the portion 31 to be straightened at a desired elevation above the elongated frame 10, the jack 51 may be inserted beneath the ends of the portion 31. Also, if desirable, suitable blocks 53 may be inserted between the portion 31 to be straightened and the frame 10 to hold the portion 31 at a selected elevation above the elongated frame 10.

If it is desired to cause an intermediate section 54 of the portion 31 to move downwardly to the dotted line position, as shown in FIG. 1, upon pulling the ends of the portion 31 in opposite directions, the chain 34 is connected to the elongated frame 31 by inserting the same through a suitable opening 33 and securing the other end of the chain to the portion 54, as shown.

With the apparatus thus attached to the portion 31 to be straightened, the power puller 42 is connected to the flexible member 46 and is actuated in a direction to move the upper end of the upstanding bracket 26 toward the rear of the elongated frame 10, thereby straightening the vehicle frame. By connecting the flexible member 46 to the upper portion of the upstanding bracket 26 and connecting the flexible member 29 to the intermediate portion thereof, a substantial leverage advantage is obtained.

In FIG. 5 of the drawings I show a modified form of my invention in which laterally spaced vertical members 22ª and 23ª are mounted on an elongated frame 10ª in substantially the same manner as the vertical members 22 and 23 are mounted on elongated frame 10. Longitudinally extending slots 56 are provided in the vertical members 22ª and 23ª for receiving laterally projecting detents 57 carried by the lower end of an upstanding bracket 58. Suitable recesses 59 are provided in the bottoms of the slots 56 for receiving the laterally projecting detents 57. Preferably, the recesses 59 extend downwardly in the direction of movement of the lower end of the upstanding bracket 58, whereby the lower end of bracket 58 is urged firmly into engagement with the recesses 59 upon movement of the upper end thereof toward the rear end of the elongated frame 10ª by actuation of the power puller in the manner described hereinabove.

In FIG. 4 of the drawings I show another modified form of my invention which comprises the elongated frame 10 supported by rollers 18, 19 and 21, together with the U-shaped frame 36 and the vertical members 22 and 23, as described hereinabove. Pivotally connected to the vertical members 22 and 23 is an upstanding member 26ª having a forwardly extending portion 61 adjacent the upper end thereof. A suitable opening 62 is provided in the upper portion of the upstanding bracket 26ª for receiving one end of the flexible member 46 which is connected at its other end to the power puller 42. Also, the flexible member 39 carried by the power puller 42 is connected to the loop member 38 carried by the U-shaped frame 36, as described above.

The forwardly extending portion 61 of the upstanding bracket 26ª is provided with a suitable opening 63 therein for receiving a flexible member 64 having a suitable hook 66 at the lower end thereof. By providing a forwardly extending portion adjacent the upper end of the upstanding bracket 26ª, the apparatus is adapted for applying a substantially upward pull to a bent portion of the frame, by attaching the hook 66 to the upper portion to be straightened and attaching the lower portion to be straightened to the elongated frame 10. This construction is particularly adapted for straightening the top of a vehicle. As will be understood, the upstanding bracket 26ª could be provided with an extension whereby it would extend well above the top of a vehicle body. The apparatus shown in FIG. 5 is also adapted for lifting engines out of vehicles.

The operation of the apparatus shown in FIG. 4 is similar to the operation of the apparatus shown in FIGS. 1–4. That is, the power puller 42 is actuated whereby the upper end of the upstanding bracket 26ª is moved toward the rear of the elongated frame 10, thereby moving the free end of the forwardly extending portion 61 upwardly and rearwardly.

From the foregoing, it will be seen that I have devised an improved apparatus for straightening vehicle frames and the like which is versatile, simple of construction and operation and one which is adapted for straightening almost any part of a vehicle body. By connecting the intermediate portion of the upstanding bracket to the portion of the frame to be straightened and pivotally connecting the lower end thereof to the elongated frame and then applying a pulling force to the upper end of the upstanding bracket, a minimum of force is required to straighten the frame. Also, by providing the flexible member 34 for holding down an intermediate section of the portion to be straightened, together with jack means to prevent inward movement of certain portions of the vehicle frame, the resultant shape of the straightened portion is controlled, thereby assuring the proper curvature of the straightened portion. Furthermore, by providing a relatively low forward end for the elongated frame which is adapted to be inserted beneath the vehicle frame, the apparatus is particularly adapted for use with the present day automobile which has a relatively low chassis.

While I have shown my invention in several forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Apparatus for straightening a vehicle frame comprising an elongated, translatable frame, means adjacent one end of said elongated frame for attaching said elongated frame to a portion of the vehicle to be straightened, a first upstanding bracket adjacent the other end of said elongated frame, laterally extending supports adjacent said other end of said elongated frame disposed to engage a subjacent supporting surface to limit twisting of said elongated frame, a prime mover operatively connected to said first upstanding bracket adjacent the upper end thereof, a second upstanding bracket pivotally connected adjacent its lower end to said elongated frame intermediate said first upstanding bracket and said means for attaching said elongated frame to a portion of a vehicle to position the prime mover and said first upstanding bracket on the opposite side of said second upstanding bracket from said end of the elongated frame attached to a vehicle, a first chain connected to said second upstanding bracket intermediate the ends of said second bracket for attaching said second upstanding bracket to another portion of the vehicle to be straightened, and a second chain above and in spaced relation to said first chain connecting the upper portion of said second upstanding bracket to said prime mover to move said second upstanding bracket about its pivot to straighten said vehicle frame.

2. Apparatus for straightening a vehicle frame as defined in claim 1 in which an adjustable connection in provided between the lower end of said second upstanding bracket and said elongated frame whereby the lower end of said second upstanding bracket may be mounted for pivotal movement at selected positions longitudinally of said elongated frame.

3. Apparatus for straightening a vehicle frame as defined in claim 1 in which a plurality of longitudinally spaced openings are provided in said second upstanding bracket intermediate the ends thereof, for receiving said first chain to thereby connect said first chain to selected ones of said openings in said second upstanding bracket.

4. Apparatus for straightening a vehicle frame as defined in claim 1 in which the elongated frame is provided with a plurality of longitudinally spaced openings for receiving one end of a chain to connect said elongated frame at selected positions to a portion of the vehicle to be straightened.

5. Apparatus for straightening a vehicle frame comprising an elongated, translatable frame, means adjacent one end of said elongated frame for attaching said elongated frame to a portion of the vehicle to be straightened, a first upstanding bracket adjacent the other end of said elongated frame, laterally extending supports adjacent said other end of said elongated frame disposed to engage a subjacent supporting surface to limit twisting of said elongated frame, a prime mover operatively connected to said first upstanding bracket adjacent the upper end thereof, a pair of laterally spaced vertical members carried by and extending longitudinally of said elongated frame intermediate said first upstanding bracket and said means for attaching said elongated frame to a portion of a vehicle, a second upstanding bracket having its lower end positioned between said vertical members, means pivotally connecting the lower end of said second upstanding bracket to said vertical members to position the prime mover and said first upstanding bracket on the opposite side of said second upstanding bracket from said end of the elongated frame attached to a vehicle, a first chain connected to said second upstanding bracket intermediate the ends of said second upstanding bracket for attaching said second upstanding bracket to another portion of the vehicle to be straightened, a second chain above and in spaced relation to said first chain operatively connecting the upper portion of said second upstanding bracket to said prime mover to move said second upstanding bracket about its pivot to straighten said vehicle frame.

6. Apparatus for straightening a vehicle frame comprising an elongated, translatable frame, means adjacent one end of said elongated frame for attaching said elongated frame to a portion of the vehicle to be straightened, a first upstanding bracket adjacent the other end of said elongated frame, laterally extending supports adjacent said other end of said elongated frame disposed to engage a subjacent supporting surface to limit twisting of said elongated frame, a prime mover operatively connected to said first upstanding bracket adjacent the upper end thereof, a second upstanding bracket pivotally connected adjacent its lower end to said elongated frame intermediate said first upstanding bracket and said means for attaching said elongated frame to a portion of a vehicle to position the prime mover and said first upstanding bracket on the opposite side of said second upstanding bracket from said end of the elongated frame attached to a vehicle, a first chain connected to said second upstanding bracket intermediate the ends of said second upstanding bracket for attaching said second upstanding bracket to another portion of the vehicle to be straightened, a second chain above and in spaced relation to said first chain operatively connecting the upper portion of said second upstanding bracket to said prime mover to move said second upstanding bracket about its pivot to straighten said vehicle frame, and a vertically extending jack carried by said elongated frame intermediate said second upstanding bracket and said end of the elongated frame attached to a vehicle in position to engage a portion of the vehicle frame to be straightened at selected positions.

7. Apparatus for straightening a vehicle frame as defined in claim 6 in which the prime mover is in the form of a power puller which is connected to the first upstanding bracket and the second upstanding bracket by flexible chains.

References Cited in the file of this patent

UNITED STATES PATENTS

| | | |
|---|---|---|
| 1,676,263 | Hawkins | July 10, 1928 |
| 2,013,785 | Merrill | Sept. 10, 1935 |
| 2,597,103 | Johnson et al. | May 20, 1952 |
| 2,597,234 | Elam | May 20, 1952 |
| 2,718,913 | Smith | Sept. 27, 1955 |
| 2,757,705 | Johnson | Aug. 7, 1956 |
| 2,836,220 | Johnson | May 27, 1958 |